(12) United States Patent
Kanbe et al.

(10) Patent No.: US 8,003,025 B2
(45) Date of Patent: Aug. 23, 2011

(54) MICROCAPSULE COMPOSITION FOR ELECTROPHORETIC DISPLAYS

(75) Inventors: Sadao Kanbe, Nagano (JP); Hideyuki Kawai, Nagano (JP); Mitsuo Kushino, Hyogo (JP); Makoto Matsumoto, Osaka (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/275,347

(22) Filed: Nov. 21, 2008

(65) Prior Publication Data

US 2009/0127728 A1  May 21, 2009

Related U.S. Application Data

(62) Division of application No. 10/611,934, filed on Jul. 3, 2003, now abandoned.

(30) Foreign Application Priority Data

Jul. 16, 2002  (JP) ................................ 2002-207328

(51) Int. Cl.
*B01J 13/04* (2006.01)

(52) U.S. Cl. .. 264/4.1; 264/4.3; 428/402.2; 428/402.24; 359/296; 209/17

(58) Field of Classification Search .................. 428/402; 427/213.3; 264/4
See application file for complete search history.

(56) References Cited

U.S. PATENT DOCUMENTS

| 4,925,678 | A | * | 5/1990 | Ranney | ......................... 424/493 |
| 5,196,149 | A |   | 3/1993 | Scarpelli | |
| 6,017,584 | A |   | 1/2000 | Albert et al. | |
| 2001/0046081 | A1 |   | 11/2001 | Hayashi et al. | |
| 2001/0055000 | A1 | * | 12/2001 | Kanae et al. | ................... 345/107 |
| 2002/0041423 | A1 | * | 4/2002 | Ogawa | ......................... 359/272 |
| 2002/0131152 | A1 |   | 9/2002 | Liang et al. | |

FOREIGN PATENT DOCUMENTS

| EP | 0 376 928 | 7/1990 |
| JP | 63-8637 | 1/1988 |
| JP | 64-86116 | 3/1989 |
| JP | 2551783 | 8/1996 |
| WO | WO 00/20922 | 4/2000 |

\* cited by examiner

*Primary Examiner* — James Seidleck
*Assistant Examiner* — Saira Haider
(74) *Attorney, Agent, or Firm* — Roylance, Abrams, Berdo & Goodman, L.L.P.

(57) ABSTRACT

The present invention provides: a microcapsule composition for electrophoretic displays; a production process for the microcapsule composition for the electrophoretic displays; a production process for a sheet for the electrophoretic displays; and a handling method for microcapsules for the electrophoretic displays; wherein the microcapsule composition contains microcapsules and, when used for the electrophoretic displays, can make them as excellent as conventional in various performances (e.g. longtime stability of displaying, respondability of displaying, contrast, and number of times of display rewritability) and, particularly above all, can make the electrophoretic displays exhibit a very high performance as to the contrast. The present invention composition is a composition used for preparation of a coating liquid and comprises an aqueous medium and microcapsules for the electrophoretic displays, wherein the microcapsules include a shell and a dispersion that is capsuled in the shell, wherein the dispersion includes a solvent and electrophoretic fine particles that are dispersed in the solvent; with the composition being characterized by: being a product as obtained without involving the step of drying the microcapsules; and having a microcapsule content of 30 to 80 weight %.

3 Claims, No Drawings

MICROCAPSULE COMPOSITION FOR ELECTROPHORETIC DISPLAYS

This application is a divisional application of Ser. No. 10/611,934, filed Jul. 3, 2003.

BACKGROUND OF THE INVENTION

A. Technical Field

The present invention relates to: a microcapsule composition for electrophoretic displays; a production process for the microcapsule composition for the electrophoretic displays; a production process for a sheet for the electrophoretic displays; and a handling method for microcapsules for the electrophoretic displays.

B. Background Art

Electrophoretic displays are non-light-emitting type display devices which utilize electrophoretic phenomena of pigment particles in a dispersion including a colored solvent and electrophoretic pigment particles that are dispersed in the solvent. The electrophoretic displays have many excellent properties, such as wide visual-sight angle, longtime memorizability without supply of electric power, and low consumption of electric power. Particularly above all, notice is drawn to microcapsules having a structure such that the above dispersion is sealed in a capsule shell to be a partition material (for example, refer to Japanese Patent No. 2551783), because such microcapsules are useful for obtaining display devices having flexibility further in addition to the above properties. There is expected further technical development into fields of so-called digital papers (e.g. paper-like displays and rewritable papers).

By the way, as to the electrophoretic displays using the microcapsules which are mentioned above as the display devices to which notice is drawn in recent years, indeed there might have been seen great enhancements in various functions such as longtime stability of displaying, respondability, contrast, and number of times of display rewritability, when compared with conventional electrophoretic displays without any microcapsule. However, the realization of further enhancement of the above various functions is in demand for making the displays utilizable universally for various uses as the displaying devices in the future and also for producing various applied examples. Particularly above all, as to the contrast that has a great influence upon image vividness, it is strongly desired to further enhance its performance.

SUMMARY OF THE INVENTION

A. Object of the Invention

An object of the present invention is to provide: a microcapsule composition for electrophoretic displays; a production process for the microcapsule composition for the electrophoretic displays; a production process for a sheet for the electrophoretic displays; and a handling method for microcapsules for the electrophoretic displays; wherein the microcapsule composition contains microcapsules and, when used for the electrophoretic displays, can make them as excellent as conventional in various performances (e.g. longtime stability of displaying, respondability of displaying, contrast, and number of times of display rewritability) and, particularly above all, can make the electrophoretic displays exhibit a very high performance as to the contrast.

B. Disclosure of the Invention

The present inventors diligently studied to solve the above-mentioned problems.

As a result, they have thought what influence will be exercised on the microcapsules themselves in stages of various treatments as required for using the microcapsules actually as constitutional elements of the electrophoretic displays should be newly studied in consideration also from the viewpoint of such as performances of the resultant displays. The reasons for this thought are as follows. Making mention of studies which have hitherto be made about the microcapsules for the electrophoretic displays, almost all of them are studies about electrophoretic fine particles to be sealed into the microcapsules and a dispersion including the electrophoretic fine particles or about constitutional elements and physical structures of the microcapsules, and there has been no especial study about, when the microcapsules as once prepared by sealing the dispersion in so as to form the capsules are thereafter actually used as constitutional elements of the electrophoretic displays, then what influence the various treatments as meanwhile carried out will exercise on the microcapsules themselves and further on performances of the displays using the microcapsules.

Thus, the present inventors have actually repeated various experiments and studies. As a result, they have noticed that there are some problems and points to be improved.

Specifically, the microcapsules have hitherto been processed by the following steps. In the case where the microcapsules have been prepared by microcapsulation in a liquid phase such as an aqueous medium, the microcapsules are thereafter removed by separating only the microcapsules from the resultant preparation liquid after the above preparation, and then subjected to such as drying to thereby form them into a finely particulate powder, or the above preparation liquid is subjected to such as centrifugal separation to thereby remove a major proportion of the liquid to thus isolate the microcapsules (for example, refer to WO 00/20922). In addition, in the case where the microcapsules have been prepared by microcapsulation in a gas phase, usually the microcapsules are thereafter recovered as they are, and then subjected to such as drying to thereby form them into a finely particulate powder. Then, both in the above cases, the microcapsules which are in such a state as dried are thereafter treated such as by classification when the occasion demands, and then mixed and dispersed into a predetermined binder to thereby form them into a paint. Thereafter this paint is coated onto such as electrode sheets to thus provide the microcapsules to the displays.

However, when the isolated microcapsules which are in such a state as dried are mixed and dispersed into the binder, a dispersed state which is uniform to a certain extent is desired. However, too much power is necessary for actually dispersing the microcapsules in such a way. The cause is such that the microcapsules are once put in such a state as dried, and that much aggregation (secondary aggregation) takes place. Then, the present inventors have found that: too much power as above causes an excessive load onto the microcapsules; and, after all, in the stage when the microcapsules have finally been provided to the displays, unimaginably many of the microcapsules have already been destroyed. As a result, all such damage to the microcapsules is a cause of hindering the enhancement of the contrast.

Based on such findings, the present inventors further studied. As a result, they have thought out a microcapsule composition in which the microcapsules are allowed to coexist with a considerably large quantity of aqueous medium in order to put the microcapsules to use for the electrophoretic displays without carrying out an operation such as of directly mixing the binder with the isolated microcapsules themselves which are in such a state as dried. That is to say, the present inventors have thought that: the microcapsules should be used for preparation of a coating liquid in the form of a composition such that the surfaces of the microcapsules are put in a state sufficiently wetted with the considerably large quantity of aqueous medium; and such a composition is a novel form that has actually never existed; and this form would be a clue to direct solution of the problems. Then, the present inventors have further found out that the content of the microcapsules in the composition should be limited into a specific range. That is to say, the present inventors have found out that: if such a microcapsule composition is used for the preparation of the coating liquid, the prior art problems can be solved at a stroke.

In addition, the present inventors have found that: in the case where the microcapsulation is carried out in a liquid phase such as an aqueous medium to prepare the microcapsules, if as conventional the microcapsules are separated from the prepared mixture liquid (preparation liquid) and thereafter dried, then not only does it take labor and costs, but also the microcapsules, as originally prepared so as to have softness to a certain extent, easily adhere to each other when once dried, so that much aggregation (secondary aggregation) inevitably takes place. Then, the aggregation (secondary aggregation) of the microcapsules more easily proceeds because of such as generation of static electricity in the subsequent dry classification apparatus, and the accuracy of the classification is extremely difficult to enhance. Furthermore, in the case of the dry classification, the friction or shock is directly applied to the microcapsule surfaces, and it is therefore inevitable for the microcapsule to be damaged to a certain extent. The present inventors have guessed that: considerably much of the destruction or damage of the microcapsules in the stage when the microcapsules have been provided to the displays is caused by the above damage during the dry classification. In addition, if the classification of the microcapsules is carried out by the dry classification, the achievement of a high accurate classification is hindered by the difference in specific gravity between the microcapsules and a gas or by an influence of the cohesive strength due to such as electrostatic force and van der Waals force. As a result, all of such deterioration of the classification accuracy and the above damage to the microcapsules is a cause of hindering the enhancement of the contrast.

As a method for obtaining the aforementioned microcapsule composition (to which the present inventors have hereupon directed their attention) in a state more optimum for putting this composition to use for the electrophoretic displays, the present inventors have thought out, on the basis of the above findings, a method in which the microcapsule composition comprising the microcapsules and the aqueous medium is obtained by subjecting the microcapsule composition to necessary treatment (e.g. classification) in a state of the above-mentioned prepared preparation liquid including the microcapsules and the aqueous medium. Specifically, the present inventors have guessed that the classification treatment of the microcapsules should be applied either to the above-mentioned prepared preparation liquid itself including the microcapsules and the aqueous medium or to such as a dilution of this preparation liquid. Because the classification treatment is applied to the preparation liquid, it inevitably follows that the classification is carried out in a wet manner. However, because such as separation and drying of the microcapsules are not carried out as conventional and because the classification is not the dry classification, the classification of the microcapsules can be carried out with good accuracy, and further it is also possible to greatly reduce the damage to the microcapsules.

In addition, the microcapsule content is usually very low in the above state of the preparation liquid just after the above preparation. In the case where a coating liquid is prepared from such a preparation liquid and then used for the electrophoretic displays, not only is it impossible to provide the microcapsules to the electrophoretic displays at an appropriate density, but also the coating liquid has such an excessively low solid content as to be difficult to utilize. Therefore, conventionally, the microcapsules are once isolated from the preparation liquid and then mixed with a binder in a state of dried particles in such an amount that the concentration will be a desirable value. However, the present inventors have thought that: if the above preparation liquid is subjected to treatment of reducing the amount of the aqueous medium (so-called concentration treatment), then the above problems can be solved. In addition, the present inventors have thought that it is favorable to carry out the concentration treatment to such an extent that the content of the microcapsules in the composition will be in a specific range. If the microcapsule composition as obtained in this way is used for the preparation of the coating liquid, then the microcapsules can be mixed and dispersed very easily and uniformly, and further the above-mentioned damage to the microcapsules can effectively be inhibited (the amount of the damaged microcapsules can greatly be reduced). In addition, it is also possible to provide the electrophoretic displays with the microcapsules dispersed at an appropriate density, and therefore the microcapsule composition is excellent also in a sense of aptitude for the use for the electrophoretic displays. As a result, various performances (e.g. contrast and image quality of the electrophoretic displays) can greatly be enhanced. That is to say, the present inventors have thought that, if in the above way the microcapsule composition having a microcapsule content in a specific range is prepared from the above preparation liquid (favorably by subjecting this preparation liquid to the classification in a wet manner and to the concentration of reducing the aqueous medium) after the preparation of the microcapsules, then the above effects are all actualized and the aforementioned problems can be solved at a stroke.

Furthermore, the present inventors have found out a handling method for microcapsules, in which the custody, preservation, transportation, and other various handling of the microcapsules are carried out in the optimum state so that more excellent electrophoretic displays can be obtained when the microcapsules as prepared by the microcapsulation by various production processes in a liquid phase or gas phase are used for the electrophoretic displays. Specifically, the present inventors have thought that the prepared microcapsules should be handled in the form of the composition in which the microcapsules are allowed to coexist with the aqueous medium. In addition, the present inventors have further found out that the microcapsule content in the above composition should be in a specific range. The same effects as those of the microcapsule composition as obtained by the above production process can be obtained by handling the microcapsules in this way.

Furthermore, the present inventors have completed a production process for a sheet for electrophoretic displays as usage of the present invention microcapsule composition.

That is to say, a microcapsule composition for electrophoretic displays, according to the present invention, is a composition used for preparation of a coating liquid and comprises an aqueous medium and microcapsules for the electrophoretic displays, wherein the microcapsules include a shell and a dispersion that is capsuled in the shell, wherein the dispersion includes a solvent and electrophoretic fine particles that are dispersed in the solvent; with the microcapsule composition being characterized by: being a product as obtained without involving the step of drying the microcapsules; and having a microcapsule content of 30 to 80 weight %.

In the present invention microcapsule composition for the electrophoretic displays, it is favorable that the microcapsules have a volume-average particle diameter of 30 to 150 μm and a particle diameter distribution by volume such that: not less than 80 volume % of the microcapsules are present within the particle diameter range of ±40% of the maximum-peak particle diameter around the maximum-peak particle diameter.

In the present invention microcapsule composition for the electrophoretic displays, it is favorable that the total content of the microcapsules and the aqueous medium in the composition is not less than 90 weight %.

A production process for the microcapsule composition for the electrophoretic displays, according to the present invention, is a production process for the microcapsule composition including an aqueous medium and microcapsules for the electrophoretic displays, wherein the microcapsules include a shell and a dispersion that is capsuled in the shell, wherein the dispersion includes a solvent and electrophoretic fine particles that are dispersed in the solvent; with the production process being characterized by comprising: the dispersing step of dispersing the electrophoretic fine particles into the solvent; and the microcapsuling step of capsuling an electrophoretic fine particle dispersion into the shell in the presence of the aqueous medium, thereby obtaining a preparation liquid including the microcapsules and the aqueous medium, wherein the electrophoretic fine particle dispersion is obtained in the dispersing step; with the production process further being characterized in that: the composition having a microcapsule content of 30 to 80 weight % is obtained without involving the step of drying the microcapsules.

In the present invention production process for the microcapsule composition for the electrophoretic displays, it is favorable that this process further comprises: the wet classification step of treating the preparation liquid to classify the microcapsules; and the concentration step of reducing the aqueous medium from a dispersion resultant from the classification step, thereby concentrating the dispersion.

In the present invention production process for the microcapsule composition for the electrophoretic displays, it is favorable that the preparation liquid to be used in the wet classification step has a microcapsule concentration of not more than 15 weight %.

A production process for a sheet for the electrophoretic displays, according to the present invention, comprises the steps of: coating a coating liquid containing a microcapsule composition for the electrophoretic displays; and drying the resultant coating film; thereby producing the sheet for the electrophoretic displays; with the production process being characterized by: using, as the composition, the above present invention microcapsule composition for the electrophoretic displays; and further comprising the step of preparing the coating liquid by mixing the composition in such an amount that the coating liquid will have a microcapsule content of 25 to 65 weight %.

A handling method for microcapsules for the electrophoretic displays, according to the present invention, is a handling method for the microcapsules including a shell and a dispersion that is capsuled in the shell, wherein the dispersion includes a solvent and electrophoretic fine particles that are dispersed in the solvent. This handling method is characterized in that the microcapsules are handled in the form of a microcapsule composition such that: the microcapsules are present in an aqueous medium; and the microcapsule composition has a microcapsule content of 30 to 80 weight %.

These and other objects and the advantages of the present invention will be more fully apparent from the following detailed disclosure.

DETAILED DESCRIPTION OF THE INVENTION

Hereinafter, detailed descriptions are specifically given about the present invention microcapsule composition for the electrophoretic displays, the present invention production process for the microcapsule composition for the electrophoretic displays, the present invention production process for the sheet for the electrophoretic displays, and the present invention handling method for the microcapsules for the electrophoretic displays. However, the scope of the present invention is not bound to these descriptions in any way. And other than the following illustrations can also be carried out appropriately within the scope not departing from the spirit of the present invention.

The present invention production process for the microcapsule composition for the electrophoretic displays (which may hereinafter be referred to as the present invention production process for the composition) is a production process for the microcapsule composition including an aqueous medium and microcapsules for the electrophoretic displays, wherein the microcapsules include a shell and a dispersion that is capsuled in the shell, wherein the dispersion includes a solvent and electrophoretic fine particles that are dispersed in the solvent. This production process is characterized by comprising the below-mentioned dispersing step and microcapsuling step and further characterized in that: the composition having a microcapsule content of 30 to 80 weight % is obtained without involving the step of drying the microcapsules.

In the present invention, the dispersing step is a step of dispersing the electrophoretic fine particles into the solvent. The dispersing liquid resultant from this step is a dispersion to be finally capsuled in the microcapsules for the electrophoretic displays.

The solvent will do if it is a solvent having hitherto been used conventionally and generally for dispersions for the electrophoretic displays. Therefore, the solvent is not especially limited. High-insulating organic solvents are favorable.

Favorable examples of the high-insulating organic solvents include one member alone or mixtures selected from the group consisting of: aromatic hydrocarbons, such as o-, m-, or p-xylene, toluene, benzene, dodecylbenzene, hexylbenzene, phenylxylylethane, and naphthenic hydrocarbons; aliphatic hydrocarbons, such as cyclohexane, n-hexane, kerosine, and paraffinic hydrocarbons; various esters, such as ethyl acetate and butyl acetate; ketones, such as acetone, methyl ethyl ketone, and methyl isobutyl ketone; alcoholic solvents, such as methanol, ethanol, isopropanol, octanol, and methyl cellosolve; halogenated hydrocarbons, such as chlorobutane, chloroform, trichloroethylene, trichlorofluoroethylene, trichloroethane, carbon tetrachloride, cyclohexyl chloride, chlorobenzene, 1,1,2,2-tetrachloroethylene, trichlorofluoroethane, tetrafluorodibromoethane, bromoethane, tetrafluorodifluoroethane, methylene iodide, triiodosilane, and methyl iodide; and carbon disulfide. Of the above, such as long-chain-alkylbenzenes (e.g. dodecylbenzene and hexylbenzene) and phenylxylylethane are more favorable because they have a high boiling point and also a high flash point, and further have almost no toxicity. These solvents may be used either alone respectively or in combinations with each other.

The amount of the solvent as used is favorably adjusted so as to be in the range of 40 to 95 weight %, more favorably 50 to 92 weight %, still more favorably 60 to 90 weight %, relative to the entire dispersion as obtained. In the case where the above amount is smaller than 40 weight %, the viscosity of the dispersion rises so much as to lower the electrophoretic ability of the electrophoretic fine particles. In the case where the above amount is larger than 95 weight %, the concentration of the electrophoretic fine particles is so low that the contrast cannot be obtained sufficiently.

The solvent is favorably a colorless and transparent solvent, and may, for example, get colored when the occasion demands.

In the case where the solvent is a colored one, there is no especial limitation on the dye used for the coloring. However, oil-soluble dyes are favorable, and such as azo dyes and anthraquinone dyes are more favorable particularly in respect of being easy to use. Specific favorable examples thereof include: as yellow dyes, azo compounds (e.g. Oil Yellow 3G (produced by Orient Chemical Co., Ltd.)); as yellowish brown dyes, azo compounds (e.g. Fast Orange G (produced by BASF)); as blue dyes, anthraquinones (e.g. Macrorex Blue RR (produced by Bayer)); as green dyes, anthraquinones (e.g. Sumiplast Green G (produced by Sumitomo Chemical Co., Ltd.)); as brown dyes, azo compounds (e.g. Oil Brown GR (produced by Orient Chemical Co., Ltd.)); as red dyes, azo compounds (e.g. Oil Red 5303 (produced by Arimoto Chemical Co., Ltd.) and Oil Red 5B (produced by Orient Chemical Co., Ltd.)); as purple dyes, anthraquinones (e.g. Oil Violet #730 (produced by Orient Chemical Co., Ltd.)); as black dyes, azo compounds (e.g. Sudan Black X60 (produced by BASF); and mixtures of Macrorex Blue FR as an anthraquinone (produced by Bayer) and Oil Red XO as an azo compound (produced by Kanto Chemical Co., Ltd.). These dyes may be used either alone respectively or in combinations with each other.

The above dye is usually used in an amount of favorably 0.1 to 10 parts by weight, more favorably 0.5 to 10 parts by weight, still more favorably 1 to 10 parts by weight, per 100 parts by weight of the solvent. In the case where the amount of the above dye as used is smaller than 0.1 part by weight, the coloring ability is so insufficient that the contrast to the electrophoretic fine particles cannot sufficiently be obtained. In the case where the above amount is larger than 10 parts by weight, the costs increase more than is necessary.

The electrophoretic fine particles will do if they are electrophoretic pigment particles, namely, colored particles that display plus or minus polarity in the dispersion. Although there is no especial limitation on their kinds, specifically there are favorably used such as white particles (e.g. Titanium Oxide) and black particles (e.g. Carbon Black and Titanium Black), and there may also be used other particles as mentioned below. These may be used either alone respectively or in combinations with each other.

In the case of using the fine particles of the titanium oxide, there is no especial limitation on the kind of the titanium oxide. That will do if it is titanium oxide as generally used as a white pigment, and the titanium oxide may be either a rutile type or anatase type. However, in the case of considering such as discoloration of colorants due to photoactive performance of the titanium oxide, the rutile type titanium oxide displaying low photoactive performance is favorable, and there is more favorable titanium oxide as processed by such as Si treatment, Al treatment, Si—Al treatment, or Zn—Al treatment for further lowering the photoactive performance.

As the electrophoretic fine particles, other particles besides the above fine titanium oxide particles, Carbon Black, and Titanium Black may be used together, and the above other particles may be used instead of such as the titanium oxide.

The above other particles are, favorably, pigment particles similarly to such as the fine titanium oxide particles. In addition, there is not always necessity for the above other particles to have the electrophoretic ability similarly to such as the fine titanium oxide particles. If necessary, the electrophoretic ability may be given by some hitherto publicly known method.

Although there is no especial limitation on the above other particles, specific favorable examples thereof include: as white particles other than the above titanium oxide, inorganic pigments (e.g. Barium Sulfate, Zinc Oxide, and Zinc White); as yellow particles, inorganic pigments (e.g. Yellow Iron Oxide, Cadmium Yellow, Titanium Yellow, and Chrome Yellow) and organic pigments, such as insoluble azo compounds (e.g. Fast Yellow), condensed azo compounds (e.g. Chromophthal Yellow), azo complex salts (e.g. Benzimidazolone Azo Yellow), condensed polycyclics (e.g. Flavans Yellow), Hansa Yellow, naphthol yellow, nitro compounds, and pigment yellow; as yellowish brown particles, inorganic pigments (e.g. Molybdate Orange) and organic pigments, such as azo complex salts (e.g. Benzimidazolone Azo Orange) and condensed polycyclics (e.g. Pelinon Orange); as red particles, inorganic pigments (e.g. Ferric Oxide Red and Cadmium Red) and organic pigments, such as dyeing lakes (e.g. Madder Lake), soluble azo compounds (e.g. Lake Red), insoluble azo compounds (e.g. naphthol red), condensed azo compounds, (e.g. Chromophthalo Scarlet Red), condensed polycyclics (e.g. Tioindigo Voldor), quinacridone pigments (e.g. Cinquasia Red Y and Fastpermanent Red), and azo pigments (e.g. Permanent Red and Fast Slow Red); as purple particles, inorganic pigments (e.g. Manganese Violet) and organic pigments, such as dyeing lakes (e.g. Rhodamine Lake) and condensed polycyclics (e.g. Dioxadine Violet); as blue particles, inorganic pigments (e.g. Iron Blue, Ultramarine, Cobalt Blue, and Cerlian Blue) and organic pigments, such as phthalocyanines (e.g. Phthalocyanine Blue), indanthrenes (e.g. Indanthrene Blue), and alkali blue; as green particles, inorganic pigments (e.g. Emerald Green, Chrome Green, Chromium Oxide, and Viridian) and organic pigments, such as azo complex salts (e.g. Nickel Azo Yellow), nitroso compounds (e.g. Pigment Green and Naphthol Green), and phthalocyanines (e.g. Phthalocyanine Green); and as black particles other than the above Carbon Black and Titanium Black, inorganic pigments (e.g. Iron Black) and organic pigments (e.g. Aniline Black). These may be used either alone respectively or in combinations with each other.

Although there is no especial limitation on the particle diameters of the electrophoretic fine particles, their volume-average particle diameter is favorably in the range of 0.1 to 5 μm, more favorably 0.2 to 3 μm. In the case where the above particle diameter (volume-average particle diameter) is smaller than 0.1 μm, there is a possibility that: the hiding performance is not sufficiently obtained in a displaying portion of the electrophoretic displays, so that the coloring degree is lowered, and there cannot be obtained electrophoretic displays having high contrast. In the case where the above particle diameter is larger than 5 μm, there is a possibility that there may occur necessity to raise the coloring degree of the particles themselves (the pigment concentration) more than is necessary, and besides, there is also a possibility that the smooth electrophoretic property of the fine particles may be lowered.

The concentration of the electrophoretic fine particles in the dispersion is favorably in the range of 5 to 60 weight %, more favorably 5 to 50 weight %, still more favorably 5 to 40 weight %. In the case where the above concentration of the electrophoretic fine particles is less than 5 weight %, there is a possibility that: neither the coloring nor the hiding performance is sufficiently exhibited by the electrophoretic fine particles in a displaying portion of the electrophoretic displays, so that a sufficient contrast cannot be obtained, and therefore a vivid displaying cannot be obtained. In the case where the above concentration is more than 60 weight %, there is a possibility that the viscosity during the dispersing treatment may be so high as to overload the dispersing apparatus, and besides, there is a possibility of aggregating the electrophoretic fine particles when high energy is applied to the displaying portion of the electrophoretic displays, or there is a possibility that the response rate (respondability of displaying) of the electrophoretic fine particles may be lowered in a portion to which a voltage is applied.

In the dispersing step, the dispersion as obtained can include some other component besides the above solvent and electrophoretic fine particles when the occasion demands. However, there is no especial limitation on such as its kind. Examples of the above other component include dispersants. The dispersants may be included either before or after the electrophoretic fine particles are dispersed into the solvent, and there is no especial limitation.

There is no especial limitation on the above dispersants. The dispersants will do if they are dispersants usable conventionally and generally for assisting the particles in being dispersed in the solvent. Specific favorable examples thereof include: anionic surfactants soluble in the dispersion, cationic surfactants, amphoteric surfactants, nonionic surfactants, fluorosurfactants, sorbitan fatty acid ester surfactants (e.g. sorbitan sesquioleate), dispersants (e.g. block polymers and graft polymers), and various coupling agents. These may be used either alone respectively or in combinations with each other. Of the above dispersants, the coupling agents are more favorable because they also enhance the dispersing stability when the charges are applied. If the fine particles are treated with the coupling agents, a coating layer of the coupling agent is formed on surfaces of the fine particles.

There is no especial limitation on the kinds of the above coupling agents. However, favorable examples thereof include: (1) silane coupling agents; (2) titanate coupling agents; (3) aluminum coupling agents; (4) vinyl-group-containing coupling agents; (5) coupling agents containing at least one group selected from among an amino group, a quaternary ammonium salt, a carboxyl group, and a phosphoric acid group; (6) coupling agents containing an amino group or a glycidyl group at their end; and (7) organosilazanes. The titanate coupling agents and the aluminum coupling agents are more favorable. Coupling agents belonging to the above various coupling agents and also containing a long-chain alkyl group are still more favorable. Titanate coupling agents and aluminum coupling agents also containing a long-chain alkyl group are particularly favorable. The above coupling agents may be used either alone respectively or in combinations with each other.

As is mentioned above, the reason that the coupling agents containing a long-chain alkyl group are favorable can be exemplified by such that: the affinity is raised by such as long-chain-alkylbenzenes which are high safe solvents, and therefore such coupling agents have high effects of raising the dispersing stability of the electrophoretic fine particles.

Although there is no especial limitation on the silane coupling agents, favorable examples thereof include: silane coupling agents containing such as a vinyl group, an amino group, a glycidyl group, and a thiol group; and silane coupling agents containing a long-chain alkyl group. These may be used either alone respectively or in combinations with each other.

Although there is no especial limitation on the titanate coupling agents, favorable examples thereof include compounds as represented by the following general formula (1):

$$(RO)_m-Ti-X_a \qquad (1)$$

(where: R denotes an alkyl group having 1 to 4 carbon atoms; X denotes an alkyl group having 8 to 18 carbon atoms, a fatty acid residue, a hydroxyphenyl group, or a hydrocarbon residue; m denotes an integer of 1 to 4; and a denotes an integer of 1 to 3). Specific favorable examples of the titanate coupling agents as represented by the above general formula (1) include isopropyl.triisostearoyl titanate, isopropyl tridecylbenzenesulfonyl titanate, isopropyl.tris(dioctylpyrophosphate)titanate, isopropyl.trioctanoyl titanate, isopropyl.dimethacryl.isostearoyl titanate, isopropyl.diacryl.isostearoyl titanate, isopropyl.tris(dioctylphosphate)titanate, isopropyl.tricumylphenyl titanate, isopropyl.tris(N-aminoethyl)titanate, tetraisopropyl.bis(dioctylphosphite)titanate, tetraoctyl.bis(ditridecylphosphite)titanate, tetra(2,2-diallyloxymethyl-1-butyl).bis(di-tridecyl) phosphite titanate, bis(dioctylpyrophosphate)oxyacetate titanate, dicumylphenyl.oxyacetate titanate, diisostearoylethylene titanate, and bis(dioctylpyrophosphate)ethylene titanate. Incidentally, these are, for example, commercially available in the trade name of Plemact from Ajinomoto Co., Inc. These may be used either alone respectively or in combinations with each other.

Although there is no especial limitation on the aluminum coupling agents, favorable examples thereof include hitherto publicly known various aluminum chelates, alkyl acetoacetate aluminum diisopropylate, and aluminum-bis(ethyl acetate)-diisopropylate. These may be used either alone respectively or in combinations with each other.

Although there is no especial limitation on the vinyl-group-containing coupling agents, favorable examples thereof include: alkoxysilanes, such as vinyltrimethoxysilane and dimethylvinylmethoxysilane; chlorosilanes, such as vinyltrichlorosilane and dimethylchlorosilane; methacryloxysilanes, such as γ-methacryloxypropyltrimethoxysilane and γ-methacryloxypropylmethyldimethoxysilane; quaternary ammonium salts, such as N-β-(N-vinylbenzylaminoethyl)-γ-aminopropyltrimethoxysilane; and titanates, such as isopropyl dimethacryl isostearoyl titanate and isopropyl diacryl isostearoyl titanate. These may be used either alone respectively or in combinations with each other.

The coupling agents containing at least one group selected from among an amino group, a quaternary ammonium salt, a carboxyl group, and a phosphoric acid group are charge-donating agents. Although not especially limited, specific favorable examples thereof include: silanes, such as γ-aminopropyltriethoxysilane and octadecyldimethyl[3-(trimethoxysilyl)propyl]ammonium chloride; titanates, such as isopropyl triisostearoyl titanate and isopropyl-tris(dioctylpyrophosphate)titanate. These may be used either alone respectively or in combinations with each other.

Although there is no especial limitation on the coupling agents containing an amino group or a glycidyl group at their end, favorable examples thereof include: silane coupling agents, such as γ-aminopropyltriethoxysilane and γ-glycidoxypropyltrimethoxysilane; and titanate coupling agents such as isopropyl-tris(N-aminoethyl)titanate. These may be used either alone respectively or in combinations with each other.

Although there is no especial limitation on the organosilazanes, it is enough that they are hitherto publicly known organosilazane compounds. Favorable examples thereof include compounds represented by the following formulas (a), (b), and (c) as described in JP-A-008637/1988.

$[(CH_3)_3Si]_2NH$ (a)

$[(C_2H_5)_3Si]_2NH$ (b)

$[(C_3H_7)_3Si]_2NH$ (c)

These may be used either alone respectively or in combinations with each other.

Although there is no especial limitation on the coupling agents containing a long-chain alkyl group, favorable examples thereof include: alkoxysilanes, such as propyltrimethoxysilane, butyltrimethoxysilane, hexyltrimethoxysilane, decyltrimethoxysilane, dodecyltrimethoxysilane, hexadecyltrimethoxysilane, and octadecyltrimethoxysilane; chlorosilanes, such as propyldodecyltrichlorosilane, butyltrichlorosilane, hexyltrichlorosilane, decyltrichlorosilane, dodecyltrichlorosilane, hexadecyltrichlorosilane, and octadecyltrichlorosilane; fluorosilanes, such as trifluoropropyltrimethoxysilane, trifluoropropyltrichlorosilane, tridecafluorooctyltrimethoxysilane, tridecafluorooctyltrichlorosilane, heptadecafluorodecyltrimethoxysilane, and heptadecafluorodecyltrichlorosilane; and titanates, such as isopropyl triisostearoyl titanate and isopropyl trioctanoyl titanate. Of these coupling agents containing a long-chain alkyl group, such as the alkoxysilanes, the chlorosilanes, and the fluorosilanes are more favorable. These may be used either alone respectively or in combinations with each other.

Although there is no especial limitation on the method for dispersing the electrophoretic fine particles into the solvent in the dispersing step, it is enough that this method is a method as conventionally used when desirable particles are dispersed into some solvent. Specific examples thereof include: a method that involves the steps of charging an ultrasonic bath with such as the fine titanium oxide particles, the solvent, and the coupling agent as raw components, and then ultrasonically dispersing the resultant mixture under stirred conditions; a method that involves the step of making a dispersion with a dispersing machine such as a paint shaker, a ball mill, and a sand grind mill; a dry method that involves the step of, while forcibly stirring the solvent and the fine particles with such as a V-blender, spraying the coupling agent thereonto by dry air or nitrogen gas; a wet method that involves the steps of properly dispersing the fine particles into the solvent to thereby form a slurry, and then adding thereto the coupling agent; and a spraying method that involves the step of, while vigorously stirring the preheated solvent and fine particles, spraying the coupling agent thereonto.

The microcapsuling step in the present invention is a step of capsuling an electrophoretic fine particle dispersion into the shell (capsule shell) in the presence of the aqueous medium, wherein the electrophoretic fine particle dispersion is obtained in the aforementioned dispersing step. The preparation liquid including the aqueous medium and the microcapsules as prepared by the microcapsulation is obtained by this step.

There is no especial limitation on the method for carrying out the above capsulation. It is enough that the method for carrying out the microcapsulation is adopted by appropriately selecting it from among conventional and publicly known methods. Specific examples thereof include so-called interfacial precipitation methods (e.g. a coacervation method (phase separation method), a melting-decomposition-cooling method, powdery bed method) and so-called interfacial reaction methods (e.g. a interfacial polymerization method, an in-situ method, a coating-film (covering) method by curing in liquids (orifice method), and an interfacial reaction method (inorganochemical reaction method)). Of the above, the coacervation method (phase separation method), the in-situ method, the interfacial polymerization method, and the melting-decomposition-cooling method are more favorable. In these various production processes, the microcapsulation is carried out in the presence of the aqueous medium, thereby obtaining the preparation liquid including the microcapsules and the aqueous medium.

Although there is no especial limitation on the aqueous medium usable in the above various production processes, specific usable examples thereof include: water; mixed liquids of water and hydrophilic solvents (e.g. alcohols, ketones, esters, and glycols); solutions as obtained by dissolving water-soluble polymers (e.g. PVA (polyvinyl alcohol), CMC (carboxymethyl cellulose), gelatins, and gum arabic) into water; solutions as obtained by adding surfactants (e.g. anionic surfactants, cationic surfactants, and nonionic surfactants) to water; or liquids as obtained by combining these aqueous mediums.

Although there is no especial limitation on the amount of the dispersion (obtained in the above dispersing step) to be dispersed into the aqueous medium, specifically this dispersion is favorably used in an amount of 20 to 200 parts by weight, more favorably 30 to 150 parts by weight, per 100 parts by weight of the aqueous medium. In the case where the above amount is smaller than 20 parts by weight, there is a possibility that the resultant microcapsules may have such a broad particle diameter distribution as to cause the lowering of the production efficiency. In the case where the above amount is larger than 200 parts by weight, there is a possibility that: a reversed suspension may be formed, and therefore the microcapsules cannot be produced.

The raw material of the capsule shell will do if it is the same as used for hitherto publicly known microcapsules. Thus, there is no especial limitation. In the case of using the coacervation method, examples of raw materials that are favorably used include anionic substances (e.g. gum arabic, sodium alginate, copolymers of styrene-maleic anhydride, copolymers of vinyl methyl ether-maleic anhydride, phthalate esters of starch, and polyacrylic acid). In the case of using the in-situ method, examples of raw materials that are favorably used include melamine-formalin resins (melamine-formalin prepolymers). In the case of using the interfacial polymerization method, hydrophilic polymers (e.g. polyamines, glycols, and polyphenols) and hydrophobic polymers (e.g. polybasic acid halides, bisharofolmerl, and polyisocyanates) are favorably used as the raw materials to form a capsule shell made of such as polyamides, epoxy resins, polyurethanes, and polyureas.

Such as polyamines may further be added to these raw materials of the capsule shell, whereby there can be obtained microcapsules having a capsule shell which is excellent in such as heat-resistant preservability. The amount of such as polyamines to be used will do if it is to such an extent as not to extremely damage desirable shell properties derived from the above raw material of the capsule shell.

Favorable examples of the above polyamines include: aliphatic amines, such as ethylenediamine, diethylenetriamine, triethylenetetramine, tetraethylenepentamine, 1,3-propylenediamine, and hexamethylenediamine; epoxy compound addition products from aliphatic polyamines, such as poly(1 to 5)alkylene($C_2$ to $C_6$)polyamine-alkylene($C_2$ to $C_{18}$) oxide addition products; aromatic polyamines, such as phenylenediamine, diaminonaphthalene, and xylylenediamine; alicyclic polyamines such as piperazine; and heterocyclic diamines such as 3,9-bis-aminopropyl-2,4,8,10-tetraoxaspiro-[5.5]undecane. These may be used either alone respectively or in combinations with each other.

Although there is no especial limitation on the amount of the raw material of the capsule shell to be used, this amount is specifically in the range of favorably 1 to 50 parts by weight, more favorably 5 to 30 parts by weight, per 1 part by weight of the electrophoretic fine particle dispersion. In the case where the above amount to be used is outside the above range, there is a possibility that the below-mentioned desirable thickness of the capsule shell cannot be obtained.

In the microcapsuling step, when the occasion demands, there can be appropriately used other components besides the above aqueous medium, the above raw material of the capsule shell, and the above dispersion as obtained in the dispersing step.

Although there is no especial limitation on the shape of the microcapsules as obtained in the microcapsuling step, it is favorable to appropriately set conditions in such a manner that the microcapsules will be the shape of particles such as true spheres.

Although there is no especial limitation on the volume-average particle diameter of the microcapsules as obtained in the microcapsuling step, specifically it is favorable to appropriately set conditions (e.g. diameters of particles dispersed in the dispersion) in such a manner that the above volume-average particle diameter will be in the range of 5 to 300 μm, more favorably 10 to 200 μm, still more favorably 15 to 150 μm. In the case where the volume-average particle diameter of the microcapsules is smaller than 5 μm, there is a possibility that: when the microcapsules are put to use for the electrophoretic displays, the displaying concentration cannot sufficiently be obtained in the displaying portion of the electrophoretic displays. In the case where the volume-average particle diameter of the microcapsules is larger than 300 μm, there is a possibility that there may occur problems in the mechanical strength of the microcapsules themselves, and besides, there is a possibility that: when the microcapsules are put to use for the electrophoretic displays, the electrophoretic properties of such as the fine titanium oxide particles in the dispersion as sealed in the microcapsules may not sufficiently be displayed, and the staring voltage for displaying may also increase.

Although there is no especial limitation on the thickness of the capsule shell of the microcapsules as obtained in the microcapsuling step, specifically it is favorable to appropriately set conditions (e.g. the amount of the raw material of the capsule shell to be used) in such a manner that the above thickness will be in the range of 0.1 to 5 μm, more favorably 0.1 to 4 μm, still more favorably 0.1 to 3 μm. In the case where the thickness of the capsule shell is less than 0.1 μm, there is a possibility that the strength as the capsule shell may not sufficiently be obtained. In the case where the thickness of the capsule shell is more than 5 μm, there is a possibility that: the transparency may be lowered so much as to cause the lowering of the contrast, and beside, the softness of the microcapsules themselves may be lowered so much as to result in insufficient adhesion to such as electrode films.

In the present invention production process for the composition, it is important that the microcapsule content in the composition as obtained is adjusted in the range of 30 to 80 weight %, favorably 35 to 80 weight %, more favorably 40 to 70 weight %. In the case where the above content is less than 30 weight %, there is a possibility that: when the composition is formed into a paint, the microcapsule concentration may become so low that the microcapsules are difficult to arrange in a layer densely by the side of each other on a surface to be coated, thus resulting in occurrence of spaces to cause a lack of displaying and therefore to cause the lowering of the contrast and the image defect (displaying defect). In addition, in the case where the above content is more than 80 weight %, there is a possibility such that: the microcapsules may mutually aggregate to cause problems in the dispersibility when the composition is formed into a paint; or the image defect (displaying defect) may be caused in the case where the microcapsules cannot sufficiently be dispersed; or, if the microcapsules are strongly dispersed, they may be damaged so much that the electrophoretic fine particle dispersion leaks from inside the microcapsules due to the pressure as applied by laminating an electrode film to be a counter electrode. Because of these problems, the resultant electrophoretic displays cannot sufficiently obtain the contrast, and have a lot of image defects (displaying defects).

In the present invention, it is important that: as mentioned above, the microcapsules to be used for the preparation of the coating liquid are produced not in the form of the isolated microcapsules which are in such a state as dried, but in the form of a composition such that the surfaces of the microcapsules are put in a state sufficiently wetted with a considerably large quantity of aqueous medium. Such a production process can reduce the labor and costs as needed for separating and then drying the microcapsules as conventional, and besides, can further reduce damage as done to the microcapsules by such as friction or shock accompanying the drying. Then, for example, as mentioned below, the resultant composition can display excellent effects when used for the preparation of the coating liquid as it is. Incidentally, in the present invention, it is necessary that the microcapsules to be used for the preparation of the coating liquid are produced in the form of a composition such that the surfaces of the microcapsules are put in a state sufficiently wetted with a considerably large quantity of aqueous medium. In addition, from the view point of the labor and costs as needed for separating and then drying the microcapsules and from the view point of the damage as done to the microcapsules by such as friction or shock accompanying the drying, it is necessary that the above composition is produced without involving the step of drying the microcapsules.

Although there is no especial limitation on the method for adjusting the microcapsule content in the range of 30 to 80 weight % in the composition as obtained, the microcapsule content in the composition is favorably adjusted in the range of 30 to 80 weight % by carrying out the concentration step of reducing the aqueous medium. However, in the case where the preparation liquid as obtained in the microcapsuling step has already been a composition having a microcapsule content of 30 to 80 weight %, such as the above concentration step is not necessary to carry out.

The above concentration step may be applied either to the preparation liquid as obtained in the microcapsuling step or to a dispersion as obtained by classification in the below-mentioned wet classification step.

The above concentration step is a step in which a treatment of reducing the amount of the aqueous medium is applied either to the preparation liquid resultant from the microcapsuling step (preparation liquid including the prepared microcapsules and the aqueous medium) or to the dispersion as obtained by classification in the below-mentioned wet classification step. That is to say, the above concentration step is a step of reducing the aqueous medium from the above preparation liquid or dispersion, thereby raising the microcapsule content. Usually in the case of considering that the composition including the microcapsules and the aqueous medium is put to use for the electrophoretic displays, then the microcapsule concentration is often too low in the preparation liquid as it is after having been obtained by the microcapsuling step. If such a preparation liquid is used as it is, for example, there are problems in that: when this preparation liquid is put to use in the form mixed into the binder, even if this mixing and the dispersing itself of the microcapsules are easy, it is after all impossible to provide the microcapsules to the electrophoretic displays at a sufficient density, and therefore the product quality is deteriorated. If the aqueous medium is reduced in the above concentration step in such a manner that the microcapsule concentration will be in a specific range, then the above problems can easily be solved. In addition, for example, when compared with such as a method in which microcapsules as once powdered by drying are dispersed into the binder, a method in which microcapsules are dispersed by mixing the binder with a concentrate of the above preparation liquid can greatly lessen the damage to the microcapsules and also can easily uniformly disperse the microcapsules.

Favorably, if the concentration step is carried out, then the composition including the microcapsules and the aqueous medium is obtained in a state where the microcapsule content is raised to a desirable range. Therefore, the labor, time, and costs for the transportation, storage, and other handling of the above composition per unit quantity of the microcapsules can be reduced, and besides, it is possible to achieve the productivity enhancement and the cost reduction as to final products such as the electrophoretic displays.

Although there is no especial limitation on the concentration method, specific examples thereof include a suction filtration method, a pressurizing filtration method, a centrifugal sedimentation method, a centrifugal filtration method, and a filter press method.

In the present invention production process for the composition, the wet classification step is favorably carried out before the above concentration step. In this case, it follows that the above concentration step is applied to a dispersion resultant from the classification in the wet classification step.

The above wet classification step is a step of carrying out a treatment of applying the classification of the microcapsules to the preparation liquid resultant from the microcapsuling step, namely, the preparation liquid including the prepared microcapsules and the aqueous medium. The classification is wet classification because the above preparation liquid is classified. Specifically, the wet classification step is, for example, a classification step of carrying out the classification treatment of the above preparation liquid either as it is or after having diluted it with such as any aqueous medium, whereby the microcapsules in the preparation liquid are classified so as to have desirable particle diameters or a desirable particle diameter distribution.

The wet classification can be carried out by methods or with apparatuses, which methods and apparatuses involve manners such as a sieving manner (filtration manner), a centrifugal sedimentation manner, and a natural sedimentation manner. The sieving manner can effectively be used for microcapsules having relatively large particle diameters.

As to the classification in the sieving manner, it is efficient and favorable to carry out this classification under application of vibration.

Examples of the classification in the centrifugal sedimentation manner include a batch manner (e.g. bucket type) and a continuous manner (e.g. cyclone type). The classification in the continuous manner is a manner in which the classification is carried out by utilizing the difference in specific gravity between the microcapsules with a high-speed rotating stream. This manner can continuously carry out the classification and therefore enables industrial mass production.

As to such a wet classification, it is favorable, for solving problems such as of mutual aggregation of particles and clogging, that the classification operation is carried in a state where the microcapsule particle concentration is low in the preparation liquid. This particle concentration is favorably not more than 15 weight %, more favorably not more than 10 weight %, still more favorably not more than 5 weight %.

In order that the microcapsule particle concentration in the preparation liquid during the wet classification step can be in the above-mentioned low range, when the occasion demands, the preparation liquid may be diluted by adding thereto the aqueous medium before the wet classification step.

The present invention production process for the composition may further comprise other steps besides the above various steps when the occasion demands. Examples thereof include a step of washing the microcapsules.

The present invention microcapsule composition for the electrophoretic displays (which may hereinafter be referred to as the present invention microcapsule composition or as the present invention composition) is a composition used for the preparation of the coating liquid and comprises the aqueous medium and the microcapsules for the electrophoretic displays, wherein the microcapsules include the shell and the dispersion that is capsuled in the shell, wherein the dispersion includes the solvent and the electrophoretic fine particles that are dispersed in the solvent; with the microcapsule composition being characterized by: being a product as obtained without involving the step of drying the microcapsules; and having a microcapsule content of 30 to 80 weight %.

The microcapsules for the electrophoretic displays, as referred to in the present invention microcapsule composition, may be conventional and publicly known microcapsules for the electrophoretic displays if the microcapsules are products as obtained without involving the step of drying the microcapsules. There is no especial limitation on such as: from what material, by what production process, and via what is production steps the microcapsules are products as obtained. In addition, the microcapsules may appropriately be processed by such as the classification treatment when the occasion demands in consideration of purposes of their use. The microcapsules are favorably the microcapsules for the electrophoretic displays in the microcapsule composition as obtained by the present invention production process. That is to say, the present invention microcapsule composition is favorably the microcapsule composition as obtained by the present invention production process.

Although there is no especial limitation on the aqueous medium as referred to in the present invention composition, specifically the same as the aqueous mediums used in the present invention production process are favorable.

The present invention composition can appropriately further comprise other components besides the aqueous medium and the microcapsules for the electrophoretic displays when the occasion demands.

The present invention microcapsule composition is characterized by having a microcapsule content of 30 to 80 weight %, more favorably 35 to 80 weight %, still more favorably 40 to 80 weight %, of the entire composition. In the case where the above content is less than 30 weight %, there is a possibility that: when the composition is formed into a paint, the microcapsule concentration may become so low that the microcapsules are difficult to arrange in a layer densely by the side of each other on a surface to be coated, thus resulting in occurrence of spaces to cause a lack of displaying and therefore to cause the lowering of the contrast and the image defect (displaying defect). In addition, in the case where the above content is more than 80 weight %, there is a possibility such that: the microcapsules may mutually aggregate to cause problems in the dispersibility when the composition is formed into a paint; or the image defect (displaying defect) may be caused in the case where the microcapsules cannot sufficiently be dispersed; or, if the microcapsules are strongly dispersed, they may be damaged so much that the electrophoretic fine particle dispersion leaks from inside the microcapsules due to the pressure as applied by laminating an electrode film to be a counter electrode. Because of these problems, the resultant electrophoretic displays cannot sufficiently obtain the contrast, and have a lot of image defects (displaying defects).

In the present invention microcapsule composition, it is favorable that the microcapsules in the composition have a volume-average particle diameter of 30 to 150 μm and a particle diameter distribution by volume such that: not less than 80 volume % of the microcapsules are present within the particle diameter range of +40% of the maximum-peak particle diameter (particle diameter corresponding to the maximum peak in the particle diameter frequency distribution by particle volume) around the maximum-peak particle diameter.

The above volume-average particle diameter is more favorably in the range of 50 to 150 μm. In the case where this volume-average particle diameter is smaller than 30 μm, there is a possibility that there cannot be obtained electrophoretic displays having a sufficient contrast. In the case where the volume-average particle diameter is larger than 150 μm, there is a possibility that there may occur problems in the strength of the microcapsules.

The above particle diameter distribution by volume is favorably a particle diameter distribution such that: not less than 80 volume % (more favorably not less than 85 volume %) of the microcapsules are present within the particle diameter range of "a particle diameter length corresponding to +40% of the maximum-peak particle diameter" around the maximum-peak particle diameter in the particle diameter frequency distribution by particle volume. In the case where the above ratio is less than 80 volume %, there is a possibility that: when the composition is formed into a paint and then coated, the microcapsules may be coated not in a layer but partially in a multilayer including at least two layers.

In the present invention microcapsule composition, the total content of the microcapsules and the aqueous medium in the composition is favorably not less than 90 weight %, more favorably not less than 93 weight %, still more favorably not less than 95 weight %, particularly favorably not less than 98 weight %. In the case where the above content is less than 90 weight %, there is a possibility that the effects of the present invention cannot be displayed sufficiently when the composition is provided to the electrophoretic displays.

In the case where the present invention microcapsule composition is (either as it is or after having been mixed with such as the binder) put to use for the electrophoretic displays, there can be produced the electrophoretic displays that are excellent in various performances (e.g. longtime stability of displaying, respondability, and number of times of display rewritability) and exhibit excellent performances particularly in such as contrast and image vividness. In the case where the electrophoretic displays are produced from the present invention microcapsule composition, for example, there can favorably be cited a method that involves the steps of: coating the above composition (either as it is or after having mixed it with such as the binder) onto such as a film having a transparent electrode; and thereafter laminating another film onto the resultant coated surface as provided with the microcapsules. In the case where the above-mentioned microcapsule composition is used in this method, the above coating liquid can be made to have moderate thixotropy in viscosity, and the above coated surface can be made to be a coated surface which has little unevenness and is so homogeneous as to be decreased also in localization and aggregation of the microcapsule particles.

As an example of favorable usage of the present invention microcapsule composition, there can be cited the production process for a sheet for the electrophoretic displays. Specifically, this process comprises the steps of: preparing a coating liquid containing the present invention microcapsule composition in a specific ratio; and then coating the prepared coating liquid onto a substrate; and then drying the resultant coating film, thereby producing the sheet for the electrophoretic displays.

That is to say, the present invention production process for the sheet for the electrophoretic displays (which may hereinafter be referred to as the present invention production process for the sheet) comprises the steps of: coating a coating liquid containing a microcapsule composition for the electrophoretic displays; and drying the resultant coating film; thereby producing the sheet for the electrophoretic displays; with the production process being characterized by: using, as the composition, the present invention microcapsule composition for the electrophoretic displays; and further comprising the step of preparing the coating liquid by mixing the composition in such an amount that the coating liquid will have a microcapsule content of 25 to 65 weight %.

In the present invention production process for the sheet, there is first prepared the coating liquid containing the present invention microcapsule composition for the electrophoretic displays. Specifically, the coating liquid is prepared, if necessary, by adding such as a binder, an additive, and an aqueous medium (e.g. aqueous medium for dilution) to the present invention microcapsule composition for the electrophoretic displays.

Examples of the aforementioned binder include water-soluble type binders and emulsion type binders.

Examples of the water-soluble type binders include water-soluble alkyd resins, water-soluble acrylic-modified alkyd resins, water-soluble oil-free alkyd resins (water-soluble polyester resins), water-soluble acrylic resins, water-soluble epoxy ester resins, and water-soluble melamine resins.

Examples of the emulsion type binders include alkyl(meth)acrylate copolymer dispersions, vinyl acetate resin emulsions, vinyl acetate copolymer resin emulsions, ethylene-vinyl acetate copolymer resin emulsions, acrylate ester (co)polymer resin emulsions, styrene-acrylate ester copolymer resin emulsions, epoxy resin emulsions, urethane resin emulsions, acrylic-silicone emulsions, and fluororesin emulsions.

Examples of the aforementioned additive include viscosity-adjusting agents (thickeners), dispersants/wetting agents, defoamers, and mildew-proofing agents/antiseptics. In the case where the coating liquid contains these additives, there is no especial limitation on their contents if they are in such a range that there can be obtained a coating liquid having desirable performances.

Examples of the viscosity-adjusting agents (thickeners) include: cellulosic viscosity-adjusting agents (thickeners), such as carboxymethyl cellulose, methyl cellulose, and hydroxyethyl cellulose; polycarboxylic viscosity-adjusting agents (thickeners), such as poly(sodium acrylate), alkaline-soluble emulsions, and associated type alkaline-soluble emulsions; polyethylene-glycolic viscosity-adjusting agents (thickeners), such as polyethylene glycol, polyethylene glycol alkyl ethers, polyethylene glycol alkyl esters, and associated type polyethylene glycol derivatives; other water-soluble polymers such as polyvinyl alcohol; and smectite type viscosity-adjusting agents (thickeners), such as montmorillonite, hectorite, and saponite. These can be used either alone respectively or in combinations with each other.

Examples of the dispersants/wetting agents include: poly(acrylate salts) and styrene-maleic acid copolymer salts; formalin condensation products from naphthalenesulfonate salts; long-chain-alkyl organic sulfonate salts; polyphosphate salts; long-chain-alkylamine salts; poly(alkylene oxides); polyoxyalkylene alkyl ethers; sorbitan fatty acid esters; fluorosurfactants, such as perfluoroalkyl-group-containing salts, perfluoroalkyl-group-containing esters, and perfluoroalkyl-group-containing oligomers; acetylenediol; and acetylene glycol. These can be used either alone respectively or in combinations with each other.

Examples of the defoamers include siliconic defoamers, pluronic type defoamers, mineral oil type defoamers, polyesteric defoamers and polyetheric defoamers. These can be used either alone respectively or in combinations with each other.

Examples of the mildew-proofing agents/antiseptics include organic nitrogen-sulfur compounds, organic nitrogen-halogen compounds, hexadienoic acid chloride salts, cresolic compounds, brominated compounds, aldehydic compounds, benzimidazolic compounds, halogenated cyclic sulfur compounds, organic arsenic compounds, organic copper compounds, chloroisothiazolone, and isothiazolone. These can be used either alone respectively or in combinations with each other.

As to the coating liquid as referred to in the present invention, it is favorable to uniformly disperse the microcapsules into the coating liquid in order to obtain a coating film in which the microcapsules are uniformly present. Examples of its means include addition of such as the dispersants/wetting agents and the viscosity-adjusting agents (thickeners), which are cited above as examples of the aforementioned additives.

Examples of the aforementioned aqueous medium include the same aqueous mediums as mentioned above.

When the aforementioned coating liquid is prepared, the aforementioned composition is mixed in such an amount that the coating liquid will have a microcapsule content of 25 to 65 weight %, favorably 30 to 60 weight %, more favorably 30 to 55 weight %, still more favorably 35 to 50 weight %. In the case where the coating liquid has a microcapsule content of less than 25 weight %, there is a possibility that: the microcapsule concentration may become so low that the microcapsules are difficult to arrange in a layer densely by the side of each other on a surface to be coated, thus resulting in occurrence of spaces to cause a lack of displaying and therefore to cause the lowering of the contrast and the image defect (displaying defect). In addition, in the case where the coating liquid has a microcapsule content of more than 65 weight %, there is a possibility such that: the microcapsules may mutually aggregate to cause problems in the dispersibility in the coating liquid; or the image defect (displaying defect) may be caused in the case where the microcapsules cannot sufficiently be dispersed; or, if the microcapsules are strongly dispersed, they may be damaged so much that the electrophoretic fine particle dispersion leaks from inside the microcapsules due to the pressure as applied by laminating an electrode film to be a counter electrode. Because of these problems, the resultant electrophoretic displays cannot sufficiently obtain the contrast, and have a lot of image defects (displaying defects).

In the present invention production process for the sheet, subsequently, the prepared coating liquid is coated onto the substrate and then dried, thereby producing the sheet for the electrophoretic displays.

Examples of the aforementioned substrate include transparent conductive films (e.g. PET films with ITO), films having a conductive layer (e.g. copper-laminated polyimide films), and films as coated with metal foils (e.g. aluminum foil) or conductive polymers (e.g. polyacetylene, polyaniline, and polypyrrole).

There is no especial limitation on the method for coating the coating liquid onto the substrate, and the coating liquid may be coated by hitherto publicly known methods.

There is no especial limitation on the conditions of the aforementioned drying step. However, the drying step may be carried out in the temperature range of favorably 15 to 150° C. (more favorably 20 to 120° C.) for favorably 1 to 60 minutes (more favorably 5 to 45 minutes).

The present invention handling method for the microcapsules for the electrophoretic displays (which may hereinafter be referred to as the present invention handling method) is a handling method for the microcapsules including the shell and the dispersion that is capsuled in the shell, wherein the dispersion includes the solvent and the electrophoretic fine particles that are dispersed in the solvent, in which handling method the microcapsules are handled by custody, preservation, transportation, and other various handling in the form of the microcapsule composition such that: the microcapsules are present in the aqueous medium; and the microcapsule composition has a microcapsule content of 30 to 80 weight %.

The microcapsules for the electrophoretic displays, as handled by the present invention handling method, will do if the microcapsules are conventional and publicly known microcapsules for the electrophoretic displays. There is no especial limitation on such as: from what material, by what production process, and via what production steps the microcapsules are products as obtained. In addition, the microcapsules may appropriately be processed by such as the classification treatment when the occasion demands in consideration of purposes of their use. Specifically, for example, microcapsules for the electrophoretic displays, which are obtained by once being prepared by microcapsulation and thereafter being isolated and then being dried and then being classified in a dry manner, can also be used as the microcapsules (as referred to in the present invention handling method) for the electrophoretic displays. However, the microcapsules are favorably the microcapsules for the electrophoretic displays in the microcapsule composition as obtained by the above present invention production process.

Examples of the handling, as referred to in the present invention, include packing into containers, repacking between containers, and measuring besides the above-mentioned custody, preservation, and transportation.

Although there is no especial limitation on the aqueous medium as referred to in the present invention handling method, specifically the same as the aqueous mediums used in the above present invention production process are favorable.

In the present invention handling method, the microcapsules for the electrophoretic displays are handled in the presence of the aqueous medium. However, other components can appropriately be used besides the aqueous medium when the occasion demands.

In addition, in the present invention handling method, the microcapsules are handled in the form of the microcapsule composition having a microcapsule content of 30 to 80 weight % of the entire composition including such as the aqueous medium as well. However, the above content is more favorably in the range of 35 to 80 weight %, still more favorably 40 to 80 weight %. In the case where the above content is less than 30 weight %, there is a possibility that: when the composition is formed into a paint, the microcapsule concentration may become so low that the microcapsules are difficult to arrange in a layer densely by the side of each other on a surface to be coated, thus resulting in occurrence of spaces to cause a lack of displaying and therefore to cause the lowering of the contrast and the image defect (displaying defect). In addition, in the case where the above content is more than 80 weight %, there is a possibility such that: the microcapsules may mutually aggregate to cause problems in the dispersibility when the composition is formed into a paint; or the image defect (displaying defect) may be caused in the case where the microcapsules cannot sufficiently be dispersed; or, if the microcapsules are strongly dispersed, they may be damaged so much that the electrophoretic fine particle dispersion leaks from inside the microcapsules due to the pressure as applied by laminating an electrode film to be a counter electrode. Because of these problems, the resultant electrophoretic displays cannot sufficiently obtain the contrast, and have a lot of image defects (displaying defects).

EFFECTS AND ADVANTAGES OF THE INVENTION

The present invention can provide: a microcapsule composition for electrophoretic displays; a production process for the microcapsule composition for the electrophoretic displays; a production process for a sheet for the electrophoretic displays; and a handling method for microcapsules for the electrophoretic displays; wherein the microcapsule composition contains microcapsules and, when used for the electrophoretic displays, can make them as excellent as conventional in various performances (e.g. longtime stability of displaying, respondability of displaying, contrast, and number of times of display rewritability) and, particularly above all, can make the electrophoretic displays exhibit a very high performance as to the contrast.

DETAILED DESCRIPTION OF THE PREFERRED EMBODIMENTS

Hereinafter, the present invention is more specifically illustrated by the following examples of some preferred embodiments in comparison with comparative examples not according to the present invention. However, the present invention is not limited to these examples in any way. Incidentally, for the sake of convenience, the units "part(s) by weight" and "liter(s)" may hereinafter be abbreviated simply to "part(s)" and "L" respectively.

Example 1

A four-necked flask of 500 mL was charged with 30 g of titanium oxide (produced by Ishihara Sangyo Kaisha, Ltd., trade name: Tipaque CR-97), 261 g of dodecylbenzene, and 2 g of titanate coupling agent (produced by Ajinomoto Co., Inc., trade name: Plemact TTS), and then these materials were mixed by stirring. Thereafter, the flask was put into an ultrasonic bath (produced by Yamato Co., Ltd., product name: BRANSON 5210) of 55° C., and then the contents of the flask were subjected to a ultrasonically dispersing treatment under stirred conditions for 2 hours, thus obtaining a titanium oxide dispersion (I).

The particle diameters of the titanium oxide in the above dispersion (1) were measured. As a result, the volume-average particle diameter was 0.34 μm. The particle diameter distribution was measured with a Shimadzu centrifugal-sedimentation-type particle diameter distribution measurement apparatus SA-CP3 (produced by Shimadzu Corporation).

Into this dispersion (1), 6 g of anthraquinone blue oil dye was dissolved, thus obtaining a blue-colored dispersion (1) for electrophoretic displays.

Under stirring with a disper (produced by Tokushu Kika Kogyo Co., Ltd., product name: ROBOMICS), 105 g of the dispersion (1) for electrophoretic displays as heated to 55° C. was added to an aqueous solution which had beforehand been prepared by dissolving 5.5 g of gum arabic and 5.5 g of gelatin into 60 g of water and then maintained at 43° C. The stirring speed was gradually raised to stir the resultant mixture at 1,050 r.p.m. for 60 minutes, thus obtaining a suspension.

While 300 mL of warm water of 43° C. was added to this suspension, the stirring speed was gradually lowered to 500 r.p.m. Furthermore, 0.75 mL of 10% aqueous $NaCO_3$ solution was added thereto, and thereafter the resultant mixture was maintained for 30 minutes. Then, 11 mL of 10% acetic acid solution was added thereto at a constant rate over a period of 25 minutes, and then the resultant mixture was cooled to not higher than 10° C.

The mixture was maintained in the cooled state for 2 hours, and then 3 mL of 37% formalin solution was added thereto at a constant rate in 30 seconds, and then 22 mL of 10% aqueous $NaCO_3$ solution was further added thereto at a constant rate over a period of 25 minutes.

The resultant mixture was cooled to ordinary temperature under stirred conditions and then aged for 20 hours, thus preparing microcapsules (1) and further obtaining a microcapsule dispersion (1). The microcapsules (1) included a shell and the aforementioned dispersion (1) for electrophoretic displays that was capsuled in the shell. In the microcapsule dispersion (1), the above microcapsules (1) were dispersed.

At that point of time, the particle diameters of the microcapsules (1) were measured with a laser-diffraction/scattering type particle-diameter-distribution measurement apparatus, HORIBA LA-910 (produced by Horiba Seisakusho Co., Ltd.). As a result, the volume-average particle diameter was 67 μm.

The microcapsule dispersion (1) as obtained was diluted with 1,500 g of water to which 1.25 mL of 10% aqueous $NaCO_3$ solution had been added. The resultant dilution was passed through a mesh sieve having a mesh opening size of 85 μm, and then placed into a separatory funnel, and then left stationary. Then, 7 hours later, the lower liquid of the separated upper and lower liquids was extracted. To the residual upper liquid, there was added 1,500 g of water to which 1.25 mL of 10% aqueous $NaCO_3$ solution had been added. These materials were uniformly mixed by hand shaking to thereby carry out re-dispersion, and thereafter left stationary. A sequence of the above operations of the stationary leaving, the extraction of the lower liquid, and the re-dispersion of the upper liquid were repeated three times, thus completing the wet classification.

The microcapsule dispersion (1) which had been subjected to the above wet classification was concentrated by suction filtration, thus obtaining a microcapsule composition (1) as a filtrated cake including the classified microcapsules (1). The classified microcapsules (1) had a volume-average particle diameter of 74.6 μm and the maximum-peak particle diameter of 77.2 μm (incidentally, the above maximum-peak particle diameter is a particle diameter corresponding to the maximum peak in the particle diameter distribution by volume; the same definition is hereinafter applied). In addition, the particle diameter distribution by volume was such that: 85 volume % of the microcapsules were present within the particle diameter range of ±40% of the maximum-peak particle diameter around the maximum-peak particle diameter. Furthermore, the microcapsules (1) were present at a content of 45 weight % in the above microcapsule composition (1). These results are listed in Table 1.

Example 2

A titanium oxide dispersion (2) was obtained by the same procedure as of Example 1 except to replace the dodecylbenzene with Highsol SA296 (produced by Nisseki Kagaku Co., Ltd.).

The particle diameters of the titanium oxide in the above dispersion (2) were measured in the same way as of Example 1. As a result, the volume-average particle diameter was 0.27 µm.

Into this dispersion (2), 6 g of anthraquinone blue oil dye was dissolved, thus obtaining a blue-colored dispersion (2) for electrophoretic displays.

Thereafter, the same procedure as of Example 1 was carried out except that: the dispersion (2) for electrophoretic displays was used instead of the dispersion (1) for electrophoretic displays, and the stirring with the diaper at 1,050 r.p.m. for 60 minutes was changed to the stirring at 800 r.p.m. for 60 minutes. Thereby, microcapsules (2) were prepared, and further a microcapsule dispersion (2) was obtained. The microcapsules (2) included a shell and the aforementioned dispersion (2) for electrophoretic displays that was capsuled in the shell. In the microcapsule dispersion (2), the above microcapsules (2) were dispersed.

At that point of time, the particle diameters of the microcapsules (2) were measured in the same way as of Example 1. As a result, the volume-average particle diameter was 105 µm.

The microcapsule dispersion (2) as obtained was diluted with 1,500 g of water to which 1.25 mL of 10% aqueous $NaCO_3$ solution had been added. The resultant dilution was passed through a mesh sieve having a mesh opening size of 130 µm. Thereafter, microcapsules having particle diameters of not larger than 70 µm were removed with a continuous wet classification apparatus, Sanitary Cyclone (produced by Nippo Co., Ltd.).

The microcapsule dispersion (2) which had been subjected to the above wet classification was concentrated by suction filtration, thus obtaining a microcapsule composition (2) as a filtrated cake including the classified microcapsules (2). The classified microcapsules (2) had a volume-average particle diameter of 113.2 µm and the maximum-peak particle diameter of 118.7 µm. In addition, the particle diameter distribution by volume was such that: 81 volume % of the microcapsules were present within the particle diameter range of ±40% of the maximum-peak particle diameter around the maximum-peak particle diameter. Furthermore, the microcapsules (2) were present at a content of 58 weight % in the above microcapsule composition (2). These results are listed in Table 1.

Example 3

In the same way as of Example 1, microcapsules (3) were prepared, and further a microcapsule dispersion (3) was obtained. In the microcapsule dispersion (3), the above microcapsules (3) were dispersed.

At that point of time, the particle diameters of the microcapsules (3) were measured in the same way as of Example 1. As a result, the volume-average particle diameter was 65 µm.

The microcapsule dispersion (3) as obtained was subjected to wet classification in the same way as of Example 1.

The microcapsule dispersion (3) which had been subjected to the above wet classification was concentrated by suction filtration in the same way as of Example 1 except that the suction amount was reduced. Thus, there was obtained a microcapsule composition (3) as a filtrated cake including the classified microcapsules (3). The classified microcapsules (3) had a volume-average particle diameter of 70.7 µm and the maximum-peak particle diameter of 75.5 µm. In addition, the particle diameter distribution by volume was such that: 88 volume % of the microcapsules were present within the particle diameter range of ±40% of the maximum-peak particle diameter around the maximum-peak particle diameter. Furthermore, the microcapsules (3) were present at a content of 33 weight % in the above microcapsule composition (3). These results are listed in Table 1.

Example 4

In the same way as of Example 2, microcapsules (4) were prepared, and further a microcapsule dispersion (4) was obtained. In the microcapsule dispersion (4), the above microcapsules (4) were dispersed.

At that point of time, the particle diameters of the microcapsules (4) were measured in the same way as of Example 2. As a result, the volume-average particle diameter was 112 µm.

The microcapsule dispersion (4) as obtained was subjected to wet classification in the same way as of Example 2 except that: there was used a mesh having a mesh opening size of 140 µm, and microcapsules having particle diameters of not larger than 80 µm were removed.

The microcapsule dispersion (4) which had been subjected to the above wet classification was concentrated by suction filtration in the same way as of Example 2 except that the suction amount was increased. Thus, there was obtained a microcapsule composition (4) as a filtrated cake including the classified microcapsules (4). The classified microcapsules (4) had a volume-average particle diameter of 121.8 µm and the maximum-peak particle diameter of 128.1 µm. In addition, the particle diameter distribution by volume was such that: 80 volume % of the microcapsules were present within the particle diameter range of +40% of the maximum-peak particle diameter around the maximum-peak particle diameter. Furthermore, the microcapsules (4) were present at a content of 75 weight % in the above microcapsule composition (4). These results are listed in Table 1.

Comparative Example 1

In the same way as of Example 1, microcapsules (c1) were prepared, and further a microcapsule dispersion (c1) was obtained. In the microcapsule dispersion (c1), the above microcapsules (c1) were dispersed.

At that point of time, the particle diameters of the microcapsules (c1) were measured in the same way as of Example 1. As a result, the volume-average particle diameter was 67 µm, and the maximum-peak particle diameter was 65.1 µm. In addition, the particle diameter distribution by volume was such that: 51 volume % of the microcapsules were present within the particle diameter range of ±40% of the maximum-peak particle diameter around the maximum-peak particle diameter.

The microcapsule dispersion (c1) as obtained was filtrated and then dried, thus obtaining a powder of the microcapsules (c1). These results are listed in Table 1.

Comparative Example 2

The powder of the microcapsules (c1) as obtained in Comparative Example 1 was passed through a mesh having a mesh opening size of 85 μm, thus obtaining microcapsules (c2) of Comparative Example 2. In the above operation of passing the powder through the mesh having a mesh opening size of 85 μm, aggregates remaining on the mesh were seen in a large amount.

The amount of the powder of the microcapsules (c2) as obtained through the mesh was 31 weight % of the entire powder of the microcapsules (c1).

The particle diameters of the microcapsules (c2) were measured in the same way as of Example 1. As a result, the volume-average particle diameter was 67 μm, and the maximum-peak particle diameter was 61.9 μm. In addition, the particle diameter distribution by volume was such that: 53 volume % of the microcapsules were present within the particle diameter range of ±40% of the maximum-peak particle diameter around the maximum-peak particle diameter. These results are listed in Table 1.

Electrophoretic displays (1) to (4), (c1), and (c2) were produced in the following procedure from the microcapsule compositions (1) to (4) and powdery microcapsules (c1) and (c2), respectively, as obtained in the above ways.

First of all, a coating liquid was prepared as follows. Any one of the microcapsule compositions (1) to (4) or the powdery microcapsules (c1) or (c2) were mixed with an acrylic emulsion for binders (solid component concentration: 45 weight %) in such an amount that the weight ratio of microcapsules/acrylic emulsion for binders would be as listed in Table 2. Water was further added to the resultant mixture in such an amount that the microcapsule content in the coating liquid would be as listed in Table 2. Thus, coating liquids (1) to (4), (c1), and (c2) were prepared.

Next, the prepared coating liquid was coated onto an ITO-having PET film with an applicator and thereafter dried at 90° C. for 10 minutes, thus preparing a coated sheet (sheet for electrophoretic displays). Subsequently, another ITO-having film was piled and thereby laminated onto the coated side of this coated sheet, thus obtaining an electrophoretic display as equipped with counter electrodes.

The case where the microcapsule content is too low in the microcapsule composition results inevitably in a low solid component concentration of the coating liquid, also. Accompanying it, the viscosity of the coating liquid also decreases so much that the leveling ability is deteriorated when the coating liquid is coated. In addition, the resultant coating film is also so thin that spaces between the microcapsules are opened so wide that the microcapsules fall into a "sparse" state. Dense existence of the microcapsules on the coated surface enhances the displaying properties and remarkably acts upon the contrast above all.

As to each of the electrophoretic displays (1) to (4), (c1), and (c2) as obtained, a direct current voltage of 30 V was applied between both electrodes for 1 second, and thereafter the contrast was measured. As to the contrast, the reflectances of blue and white displays were measured with a Macbeth spectrophotometric densitometer, SpectroEye (produced by Gretag Macbeth), and the contrast was represented by the ratio (contrast) between these reflectances (ratio (contrast) between reflectances=white reflectance/blue reflectance). Incidentally, the ratio between reflectances is a value as obtained by: measuring a reflectance of a display (e.g. blue) when the direct current voltage is applied between the counter electrodes of the electrophoretic display; and subsequently measuring a reflectance of a display (e.g. white) when the polarity is reversed to apply the direct current voltage; and then calculating the ratio between both reflectances. It is hereupon prescribed that the reflectance should be measured as to one entire face of the electrophoretic display.

In addition, the coated surface was optically magnified with a microscope (produced by Highlocks Co., Ltd., product name: Power High Scope KH-2700) to observe and evaluate a state of rows of the microcapsules and a damaged or defective (non-electrophoretic) state of the microcapsules on the following standards.

Their results are listed in Table 1.
(State of Rows of Microcapsules):

⊚: The microcapsules are densely packed without spaces, and there is also little overlap between the microcapsules, and there are no aggregates.

○: The microcapsules are in a dense state as a whole, but there are some "sparse" portions. There are also some overlap portions between the microcapsules, but there are no aggregates.

Δ: There are also dense portions, but there are also considerably many "sparse" portions. There is little overlap between the microcapsules, but aggregates are seen.

x: The microcapsules are sparse, and there are few dense portions. There are also considerably many aggregates.
(Damage or Defect (Non-Electrophoresis) of Microcapsules):

There was counted the number of damaged or defective (non-electrophoretic) microcapsules existing in any five visual fields (200 to 400 microcapsules existed per one visual field) under 200 magnifications.

TABLE 1

|  | Microcapsule content (wt %) | Volume-average particle diameter (μm) | Maximum-peak particle diameter (μm) | Ratio of microcapsules present within particle diameter range of ±40% of maximum-peak particle diameter around it (vol. %) | Ratio (contrast) between reflectances | State of rows of microcapsules | Number of damaged or defective microcapsules |
|---|---|---|---|---|---|---|---|
| Example 1 | 45 | 74.6 | 77.2 | 85 | 5.6 | ⊚ | 6 |
| Example 2 | 68 | 113.2 | 118.7 | 81 | 7.2 | ⊚ | 8 |
| Example 3 | 33 | 70.7 | 75.5 | 88 | 4.7 | ○ | 13 |
| Example 4 | 75 | 121.8 | 128.1 | 80 | 6.9 | ○ | 11 |
| Comparative Example 1 | 100 | 62.1 | 65.1 | 51 | 2.1 | X | 36 |
| Comparative Example 2 | 100 | 60.3 | 61.9 | 53 | 2.8 | Δ | 28 |

TABLE 2

| | Microcapsules used | Microcapsules/ acrylic emulsion for binders (weight ratio) | Microcapsule content in coating liquid (weight %) |
|---|---|---|---|
| Coating liquid (1) | Microcapsule Composition (1) | 10/2 | 40 |
| Coating liquid (2) | Microcapsule Composition (2) | 10/4 | 45 |
| Coating liquid (3) | Microcapsule Composition (3) | 10/0.5 | 30 |
| Coating liquid (4) | Microcapsule Composition (4) | 10/1 | 60 |
| Coating liquid (c1) | Microcapsule Composition (c1) | 10/4 | 50 |
| Coating liquid (c2) | Microcapsule Composition (c2) | 10/4 | 40 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a microcapsule composition for electrophoretic displays, wherein the microcapsule composition includes an aqueous medium and microcapsules for the electrophoretic displays, wherein the microcapsules include a shell and an electrophoretic fine particle dispersion that is capsuled in the shell, wherein the electrophoretic fine particle dispersion includes a solvent and electrophoretic fine particles that are dispersed in the solvent;
with the production process comprising:
a dispersing step of dispersing the electrophoretic fine particles into the solvent to obtain the electrophoretic fine particle dispersion;
a microcapsuling step of capsuling the electrophoretic fine particle dispersion into the shell in the presence of the aqueous medium, thereby obtaining a preparation liquid including the microcapsules and the aqueous medium, the preparation liquid having a microcapsule concentration of not more than 15 weight %,
a wet classification step of treating the preparation liquid to classify the microcapsules, and
a concentration step of reducing the aqueous medium from a dispersion resultant from the classification step, thereby concentrating the dispersion and forming the microcapsule composition,
wherein:
the composition having a microcapsule content of 30 to 80 weight % is obtained without involving the step of drying the microcapsules.

2. The production process of claim 1, wherein the microcapsules have a shell thickness in the range of 0.1 to 5 μm.

3. The production process of claim 1, wherein the microcapsules have a volume-average particle diameter of 30 to 150 μm and not less than 80% by volume of the microcapsules being present within the particle diameter range of ±40% of the maximum-peak particle diameter around the maximum-peak particle diameter.

* * * * *